United States Patent
Fotland et al.

(10) Patent No.: US 7,120,783 B2
(45) Date of Patent: Oct. 10, 2006

(54) SYSTEM AND METHOD FOR READING AND WRITING A THREAD STATE IN A MULTITHREADED CENTRAL PROCESSING UNIT

(75) Inventors: David A. Fotland, San Jose, CA (US); Tibet Mimaroglu, Sunnyvale, CA (US)

(73) Assignee: Ubicom, Inc., Sunnyvale, CA (US)

( * ) Notice: Subject to any disclaimer, the term of this patent is extended or adjusted under 35 U.S.C. 154(b) by 472 days.

(21) Appl. No.: 09/888,296

(22) Filed: Jun. 22, 2001

(65) Prior Publication Data

US 2002/0038416 A1 Mar. 28, 2002

Related U.S. Application Data

(63) Continuation-in-part of application No. 09/748,098, filed on Dec. 21, 2000.

(60) Provisional application No. 60/250,781, filed on Dec. 1, 2000, provisional application No. 60/213,745, filed on Jun. 22, 2000, provisional application No. 60/171,731, filed on Dec. 22, 1999.

(51) Int. Cl.
G06F 9/34 (2006.01)

(52) U.S. Cl. ................... 712/228; 712/225

(58) Field of Classification Search ............ 712/228, 712/225
See application file for complete search history.

(56) References Cited

U.S. PATENT DOCUMENTS

| | | | |
|---|---|---|---|
| 4,110,831 A | 8/1978 | Langdon, Jr. | |
| 4,777,587 A | 10/1988 | Case et al. | |
| 4,821,187 A | 4/1989 | Ueda et al. | |
| 4,825,355 A | 4/1989 | Kurakazu et al. | |
| 4,939,735 A | 7/1990 | Fredericks et al. | |
| 5,163,146 A | 11/1992 | Antanaitis, Jr. et al. | |
| 5,247,636 A | 9/1993 | Minnick et al. | |
| 5,260,703 A | 11/1993 | Nguyen et al. | |
| 5,392,435 A | 2/1995 | Masui et al. | |
| 5,404,469 A | 4/1995 | Chung et al. | |
| 5,410,658 A | 4/1995 | Sawase et al. | |
| 5,430,884 A | 7/1995 | Beard et al. | |
| 5,515,538 A | 5/1996 | Kleiman | |
| 5,524,250 A | 6/1996 | Chesson et al. | |
| 5,727,211 A | 3/1998 | Gulsen | |
| 5,761,470 A | 6/1998 | Yoshida | |
| 5,867,725 A | 2/1999 | Fung et al. | |
| 5,907,694 A | 5/1999 | Suzuki et al. | |
| 5,933,650 A | 8/1999 | van Hook et al. | |
| 5,944,816 A | 8/1999 | Dutton et al. | |

(Continued)

FOREIGN PATENT DOCUMENTS

WO  WO 99/54813  10/1999

OTHER PUBLICATIONS

Nemirovsky, Dr. Mario Daniel; Brewer, Dr. Forrest; and Wood, Dr. Roger C.; DISC: Dynamic Instruction Stream Computer; 1991; ACM; pp. 163-171.

(Continued)

*Primary Examiner*—Fritz Fleming
*Assistant Examiner*—Tonia L. Meonske
(74) *Attorney, Agent, or Firm*—Fenwick & West LLP

(57) ABSTRACT

A system and method for enabling multithreading in a embedded processor, invoking zero-time context switching in a multithreading environment, scheduling multiple threads to permit numerous hard-real time and non-real time priority levels, fetching data and instructions from multiple memory blocks in a multithreading environment, and enabling a particular thread to modify the multiple states of the multiple threads in the processor core.

4 Claims, 13 Drawing Sheets

U.S. PATENT DOCUMENTS

| | | | |
|---|---|---|---|
| 6,009,505 | A | 12/1999 | Thayer et al. |
| 6,026,503 | A | 2/2000 | Gutgold et al. |
| 6,061,710 | A | 5/2000 | Eickemeyer et al. |
| 6,085,215 | A | 7/2000 | Ramakrishnan et al. |
| 6,317,774 | B1 | 11/2001 | Jones et al. |
| 6,366,998 | B1 | 4/2002 | Mohamed |
| 6,378,018 | B1 | 4/2002 | Tsern et al. |
| 6,385,713 | B1 | 5/2002 | Yung |
| 6,460,116 | B1 | 10/2002 | Mahalingaiah |
| 6,493,741 | B1 | 12/2002 | Emer et al. |
| 6,542,991 | B1 * | 4/2003 | Joy et al. ............ 712/228 |
| 6,567,839 | B1 | 5/2003 | Borkenhagen et al. |
| 6,718,360 | B1 | 4/2004 | Jones et al. |
| 6,728,722 | B1 * | 4/2004 | Shaylor ............ 707/101 |
| 6,766,515 | B1 | 7/2004 | Bitar et al. |
| 2003/0037228 | A1 | 2/2003 | Kelsey et al. |
| 2003/0110344 | A1 | 6/2003 | Szczepanek et al. |

OTHER PUBLICATIONS

Schwan, Karsten and Zhou, Hongyi; Dynamic Scheduling Of Hard Real-Time Tasks And Real-Time Threads; IEEE Transactions On Software Engineering; vol. 18, No. 8; Aug. 1992; pp. 736-748.

Eggers, S. et al., "Simultaneous Multithreading: A Platform for Next-Generation Processors," IEEE Micro, Oct. 1997, pp. 12-19.

Intel Corporation, Pentium Processor Family Developer's Manual, vol. 3; Architecture and Programming Manual, 1995, pp. 25-1 and 25-30.

El-Kharashi, et al., Multithreaded Processors: The Upcoming Generation for Multimedia Chips, 1998 IEEE Symposium on Advances in Digital Filtering and Signal Processing, Jun. 5-6, 1998, pp. 111-115.

Binns, P. "A Robust High-Performance Time Partitioning Algorithm: The Digital Engine Operating System (DEOS) Approach," 2001, pp. 1.B.6-1.B.6-12.

* cited by examiner

| OCCB-16 | OCCB-32 | ESO | STS | EDO | DTS | Other |
|---|---|---|---|---|---|---|

Figure 6B

Time

Time

Time

SYSTEM AND METHOD FOR READING AND WRITING A THREAD STATE IN A MULTITHREADED CENTRAL PROCESSING UNIT

RELATED APPLICATIONS

This application is a continuation-in-part of U.S. patent application Ser. No. 09/748,098 filed on Dec. 21, 2000 which claims priority from U.S. provisional application No. 60/250,781 filed on Dec. 1, 2000, U.S. provisional application No. 60/213,745 filed on Jun. 22, 2000, and U.S. provisional application No. 60/171,731 filed on Dec. 22, 1999, which are all incorporated by reference herein in their entirety. This application claims priority to all of the above identified applications.

BACKGROUND OF THE INVENTION

1. Field of the Invention

The invention relates to the field of embedded processor architecture and more particularly to multithreaded central processing units (CPUs).

2. Description of Background Art

Conventional embedded processors, e.g., microcontrollers, support only a single hard real-time asynchronous process since they can only respond to a single interrupt at a time. Most software implementations of hardware functions-called virtual peripherals (VPs)—respond asynchronously and thus their interrupts are asynchronous. Some examples of VPs include an Ethernet peripheral (e.g., 100 Mbit and 10 Mbit Transmit and receive rates); High-speed serial standards peripherals, e.g., 12 Mbps universal serial bus (USB), IEEE-1394 Firewire Voice Processing and Compression: ADPCM, G.729, Acoustical Echo Cancellation (AEC); an image processing peripheral; a modem; a wireless peripheral, e.g., an IRDA (1.5 and 4 Mbps), and Bluetooth compatible system. These VPs can be used as part of a home programmable network access (PNA) system, a voice over internet protocol (VoIP) system, and various digital subscriber line systems, e.g., asymmetric digital subscriber line (ADSL), as well as traditional embedded system applications such as machine control.

An embedded processor is a processor that is used for specific functions. Embedded processors generally have some memory and peripheral functions integrated on-chip. Conventional embedded processors have not been capable of operating using multiple hardware threads.

A pipelined processor is a processor that begins executing a second instruction before the first instruction has completed execution. That is, several instructions are in a "pipeline" simultaneously, each at a different stage. FIG. 1 is an illustration of a conventional pipeline.

The fetch stage (F) fetches instructions from memory, usually one instruction is fetched per cycle. The decode stage (D) reveals the instruction function to be performed and identifies the resources needed. Resources include general-purpose registers, buses, and functional units. The issue stage (I) reserves resources. For example, pipeline control interlocks are maintained at this stage. The operands are also read from registers during the issue stage. The instructions are executed in one of potentially several execute stages (E). The last writeback stage (W) is used to write results into registers.

One example of a non-conventional multithreaded processor is described in U.S. patent application Ser. No. 09/748,098 that is referenced above, that enables each stage of the pipeline to be processing a thread that is different from the thread in either the preceding or following stage. This permits the multithreaded processor to interleave the processing of multiple threads which permits the timely processing of time-critical applications and interrupts, for example.

A problem with conventional multithreaded processors is that each thread has a separate hardware state for each thread. This hardware state may be in the form of separate sets of registers. However, in normal operation such conventional systems permit each thread access only to its own set of state registers, i.e., its own state. There is no ability to use or alter the characteristics of other states. This restriction limits the ability for a particular thread to take control of the system and to initialize a thread while other threads are still operating, for example.

What is needed is a system and method that (1) enables a thread in a multithreaded processing environment to access states of other threads and; (2) enables a thread to store states of other threads.

SUMMARY OF THE INVENTION

The invention is a system and method for the enabling multithreaded processing in an embedded processor such that one thread may access and store information into the state of a different thread. The present invention uses a register to identify the state from which a source operand is retrieved and to identify the state to which a destination operand is stored. In addition, the present invention includes an instruction that permits the setting of the source and destination thread back to the executing thread.

BRIEF DESCRIPTION OF THE DRAWINGS

FIG. 6B is an illustration of a control and status register (CSR) according to one embodiment of the present invention.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit(s) of each reference number corresponds to the figure in which the reference number is first used.

The present invention is a system and method that solves the above identified problems. Specifically, the present invention enables multithreading in an embedded processor such that one thread can read state information from another thread and can write state information to the state of another thread.

Figure 1:
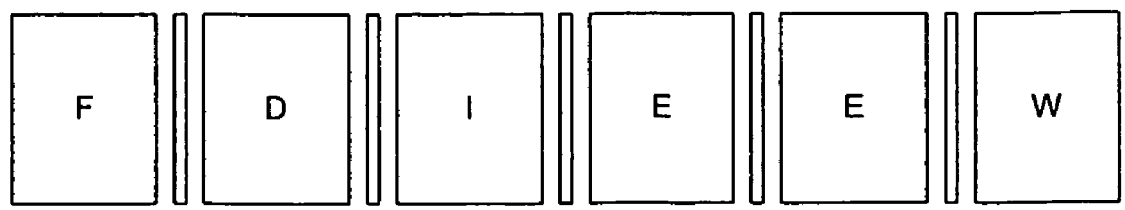
FIG. 1 is an illustration of a conventional pipeline in a pipelined processing environment.
Figure 2:
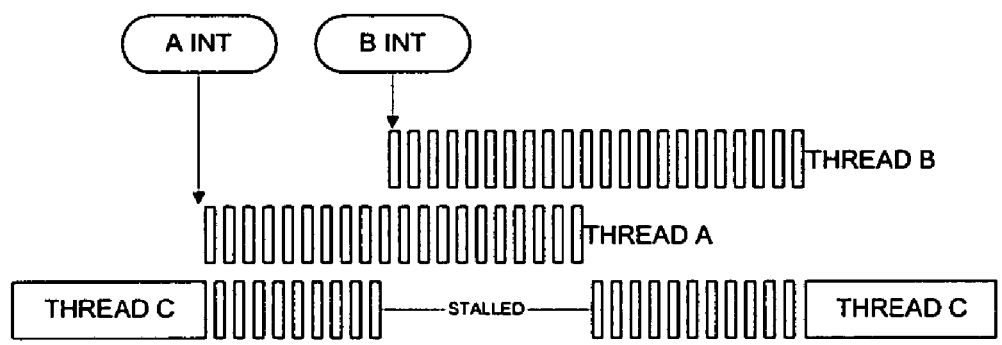
FIG. 2 is an illustration of an interrupt response in a conventional multithreaded environment.

The multithreading capability of the present invention permits multiple threads to exist in the pipeline concurrently. For example, a multithread environment can be used to efficiently handle interrupts where is interrupt service routine can be a separate thread. FIG. 2 is an illustration of an interrupt response in a multithreaded environment. Threads A and B are both hard-real-time (HRT) threads which have stalled pending interrupts A and B respectively. Thread C is the main code thread and is non-real-time (NRT). When interrupt A occurs, thread A is resumed and will interleave with thread C. Thread C no longer has the full pipeline throughput since it is NRT. When interrupt B occurs thread B is resumed and, being of the same priority as thread A, will interleave down the pipeline, thread C is now completely stalled. The main code, thread C, will continue executing only when the HRT threads are no longer using all of the pipeline throughput. Each thread has an associated set of registers that stores the state of that thread and is used when processing the thread. The present invention enables one thread, e.g., thread C, to access and modify the state of another thread, e.g., state A, as described below.

Figure 4:
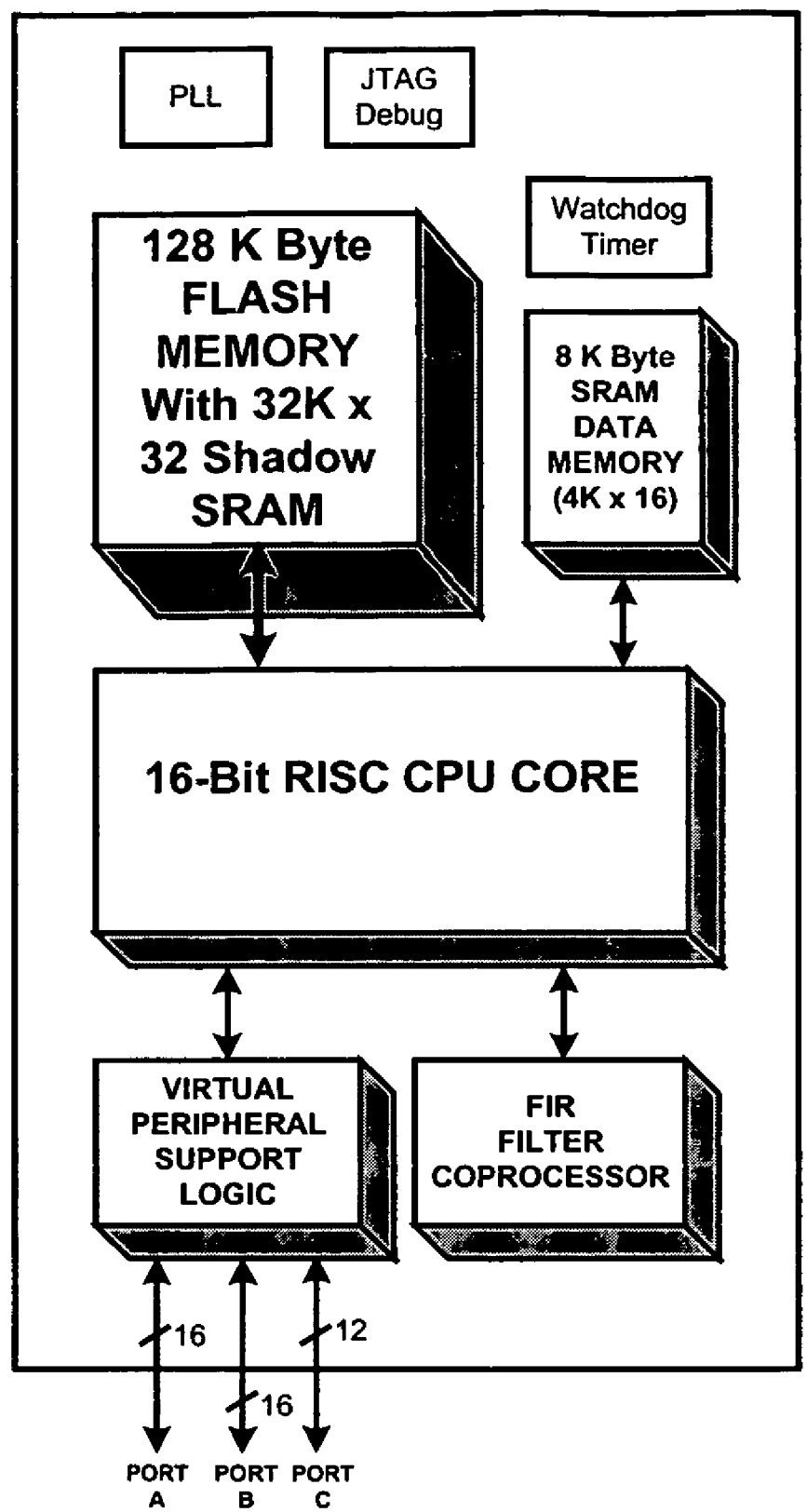
FIG. 4 is an illustration of an embedded processor according to one embodiment of the present invention.

FIG. 4 is an illustration of an embedded processor according to one embodiment of the present invention. The embedded processor can include peripheral blocks, such as a phase locked loop (PLL), or a watchdog timer. The embedded processor can also include a flash memory with a shadow SRAM. The shadow SRAM provides faster access to the program. In some semiconductor manufacturing processes SRAM access is faster than flash access. The loading of a program into the shadow SRAM is under program control. The embedded processor also includes a conventional SRAM data memory, a CPU core, input/output (IO) support logic called virtual peripheral support logic, and a math coprocessor. The multithreading aspect of the present invention takes place largely in the CPU where the multiple thread contexts and thread selection logic reside. In addition, in some embodiments the multithreading might also exist in a coprocessor or DSP core which is on the same chip.

Figure 3:
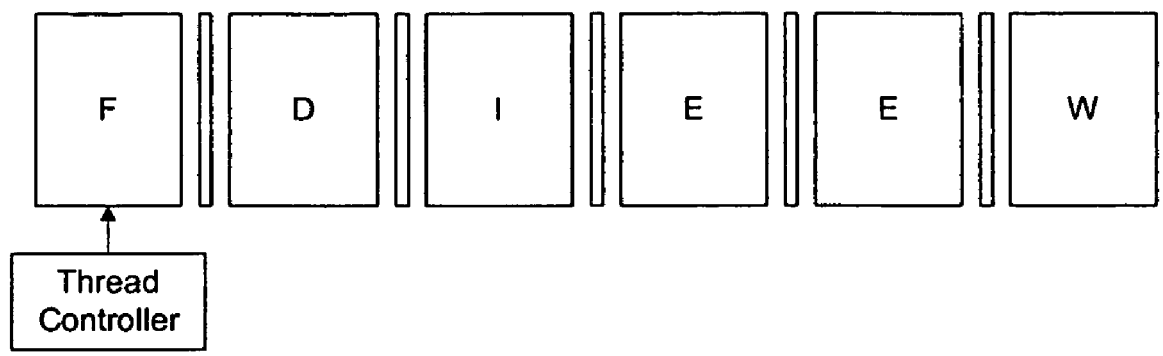
FIG. 3 is an illustration of a multithreaded fetch switching pipeline according to one embodiment of the present invention.

FIG. 3 is an illustration of a multithreaded fetch switching pipeline according to one embodiment of the present invention. The processor will function with information from different threads at different stages within the pipeline as long as all register accesses relate to the correct registers within the context of the correct thread.

By thread switching every cycle (or every quanta, i.e., a set number of cycles or instructions) the system will also reduce/eliminate the penalty due to a jump (requiring a pipeline flush) depending on the number of equal-priority threads which are active. There is only a need to flush the jumping thread and so if other threads are already in the pipeline the flush is avoided/reduced.

As described above, a program context is the collection of registers that describe the state of the machine. Each thread has its own context. A context would typically include the program counter, a status register, and a number of data and address registers. It is possible that there are also some other registers that are shared among all programs.

As an instruction is passed down the pipeline, a context number is also passed with it. This context number determines which context registers are used to load the program counter, load register values from or to save register values to. Thus, each pipeline stage is capable of operating in separate contexts. Switching between contexts is simply a matter of using a different context number. In other embodiments of the present invention the decode and issue stages are combined into a single stage.

Figure 5A:
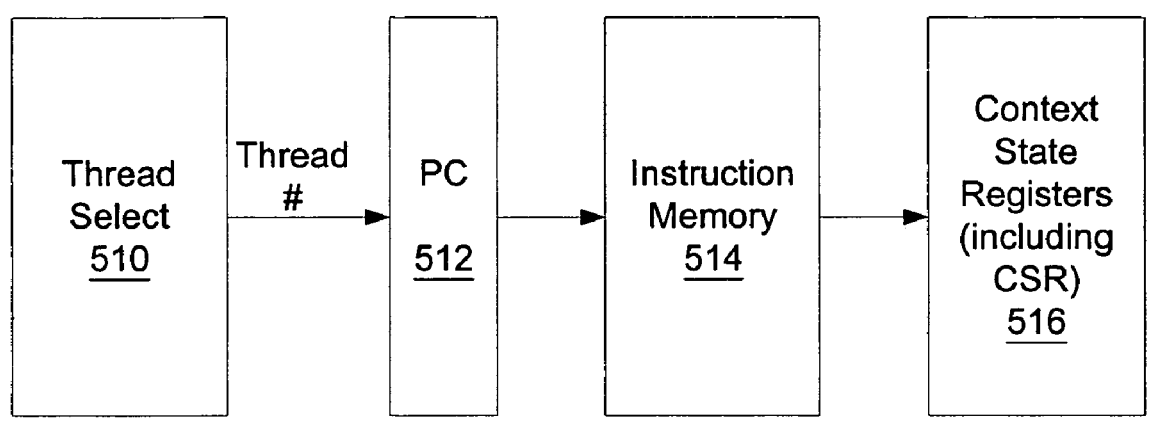
FIG. 5a is an illustration of the thread selection process and context selection process according to one embodiment of the present invention.
Figure 5B:
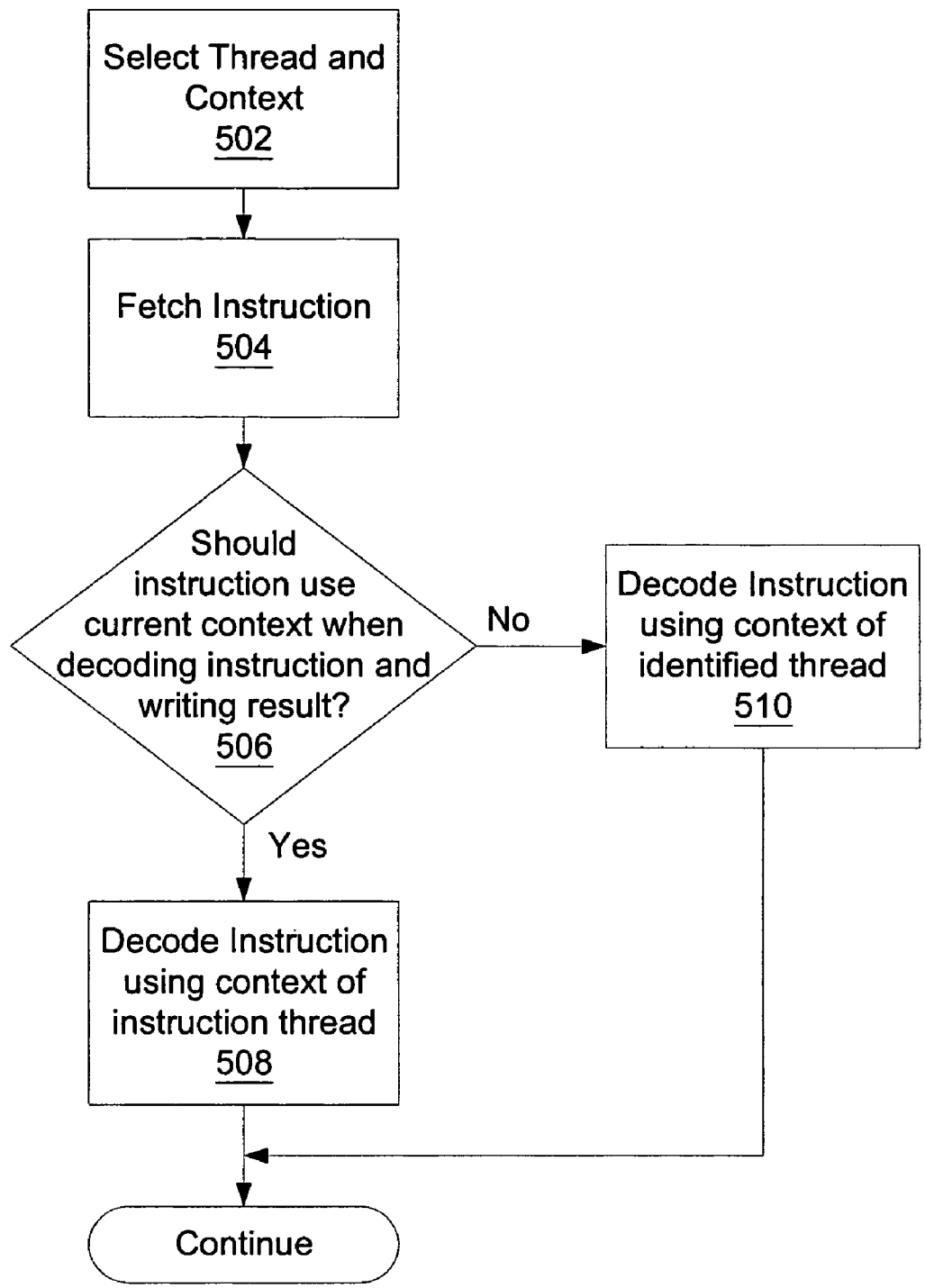
FIG. 5b is a flowchart of the context access selection and context write selection process according to one embodiment of the present invention.

FIG. 5a is an illustration of the thread selection process and context selection process according to one embodiment of the present invention. FIG. 5b is a flowchart of the context access selection and context write selection process according to one embodiment of the present invention. The process of identifying the context of a thread is described with respect to FIGS. 5a and 5b. A thread is selected 502 in the thread selection unit 510 using any one of a variety of processes. Some techniques for scheduling and selecting threads are described below. Each thread has an associated context (state). Therefore, once the thread is selected, the context is known. In one embodiment of the present invention, a read only status register (ROSR) that is associated with a particular thread (and is described below with reference to FIG. 6) stores the context number. The next instruction in the thread is then fetched 504 and the instruction address is decoded and stored in the program counter 512 (PC). The instruction is then fetched from memory 514. In one embodiment of the present invention instructions may use operands that are fetched and stored in source registers, e.g., two source registers (S1, S2) and the result of the instruction is stored in a destination register (D). In other systems when executing the instruction the source registers and the destination registers must all be from the same context. In the present invention, one or more of these registers can be from a different set of registers associated with a different context. The details of how this is accomplished, according to one embodiment of the present invention, is described below.

The present invention determines 506, for each register of each operand which context should be used as the source or destination. For example, to add the contents of two registers (A, B) and store them in a third register (C) the ADD operand of one embodiment of the present invention determines the context, i.e., the set of context registers 516, from which register A and B are to be retrieved. In one embodiment of the present invention, the second source register, e.g., B, is always retrieved from the context of the instruction. If the instruction is part of a thread associated with a first context the present invention can use a register from a second context. To do this, the address of register A is the address of a register in the set of registers representing the second context. Similarly, when storing the result in register C, the present invention determines the context, and thus which set of registers, the result should be stored in.

Figure 6A:
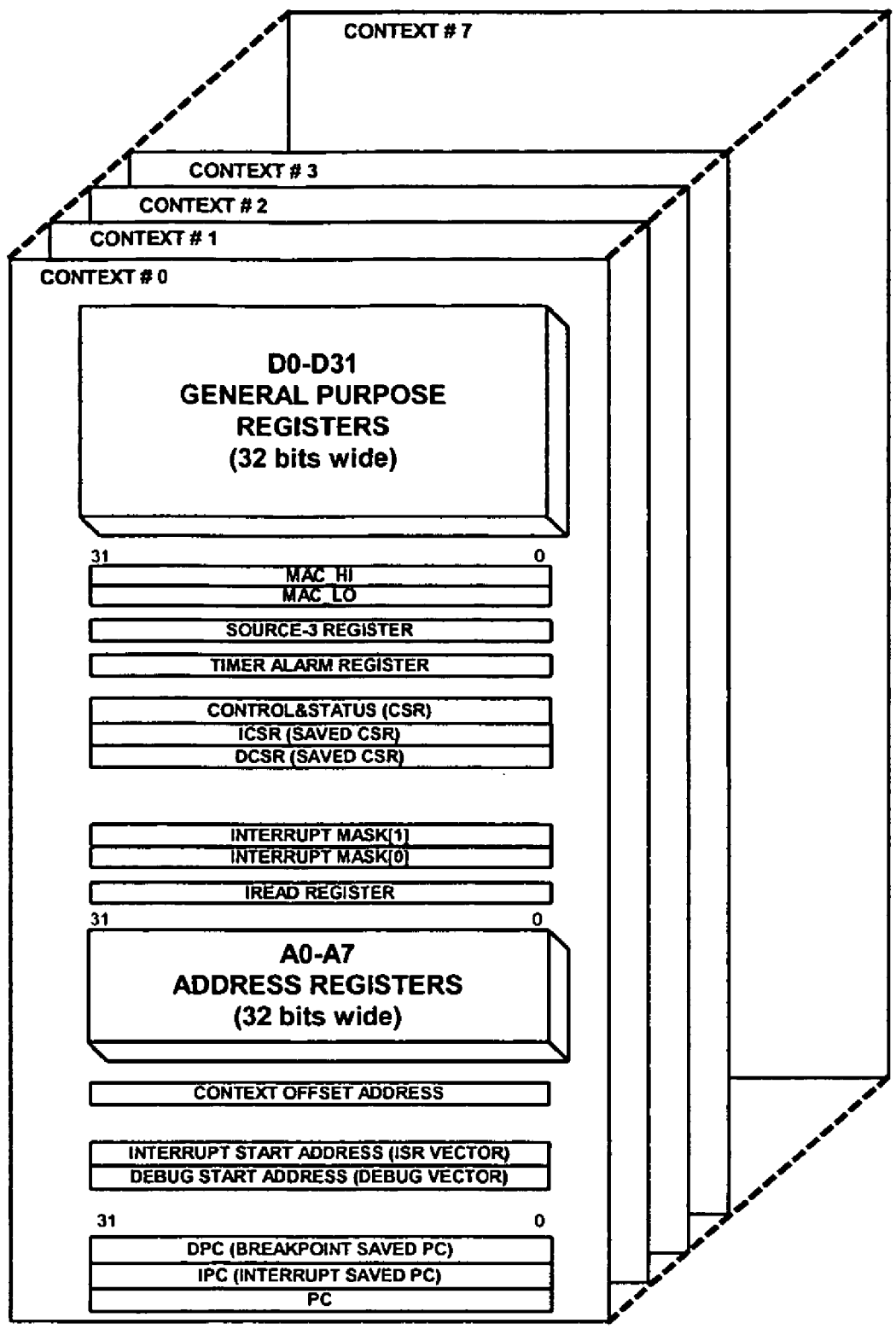
FIG. 6A is an illustration of several sets of registers, each set of registers storing the state of one context, e.g., thread, according to one embodiment of the present invention.

FIG. 6a is an illustration of several sets of registers, each set of registers storing the state of one context, e.g., thread, according to one embodiment of the present invention. Each set of registers forms a context in which a program thread executes. FIG. 6a includes 7 contexts with each context having 32 general purpose registers, 8 address registers and a variety of other information as illustrated. The type of data that is stored as part of a thread's context may differ from that illustrated in FIG. 6a.

In the embodiment of the present invention illustrated in FIG. 6a registers D0–D31 are general purpose 32 bit data registers. Registers A0–A6 are 32 bit address registers and are used as pointers to operands, as described above. Register A7 is a 32 bit stack pointer register. $MAC_{13}HI$ is a 32 bit register that stores the high 16 bits of a multiply-accumulate (MAC) result. MAC_LO is a 32 bit register that stores the lower 32 bits of the multiply and accumulate result. The MAC_RC16 register is a rounded and clipped S16.15 image of the MAC register contents and can be used for a variety of functions including creating a result for a digital signal processing application, where the result is at lower precision than the MAC registers. The Source_3 register is used as a third source register for instructions that can use three source operands. One example of such an instruction is a double-shift instruction (SHFTD) that uses the Source_3 register to supply its right shift count. The Context_cnt register maintains a count of the executed instructions for the associated context. When the execution of a context is suspended, the associated count will also stop.

Figure 6B:
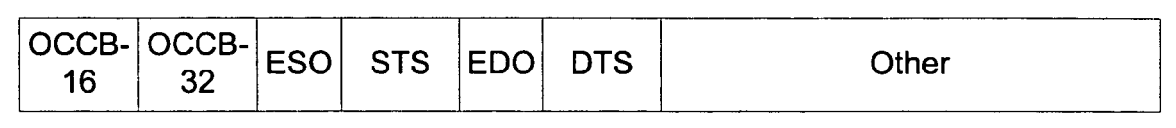

The control and status (CSR) register is a 32 bit register that is described in greater detail below with respect to FIG. 6b. The read only status register (ROSR) is a 32 bit register that is an extension of a control status register (CSR), described below, that is set by hardware and is capable of being read by software, but not set by software. When bit 0 is set it indicates a pending interrupt condition for the thread associated with the context. When bit 1 is set it indicates that the FLASH memory is busy and that the thread has an uncompleted FLASH memory access operation in progress, e.g., a read, write or erase command. Bits 12–16 identify the current context. As described above, these bits indicate the context associated with the thread and will be the default context for all operands. The remaining bits may be used for other status indications. The interrupt mask registers are two 32 bit registers that can be combined to define a 64 bit mask which can be used to determine when an interrupt is seen by the thread. The IREAD register stores the output of an IREAD instruction. The program counter (PC) is a 32 bit program counter.

The control and status register (CSR) includes condition codes and other status bits as well as thread-specific control bits. The CSR can be read from and written to by both hardware and software. FIG. 6B is an illustration of the CSR according to one embodiment of the present invention. Bits 3–0 of the CSR are the 16-bit operand condition code bits (OCCB) in the order $\{N,Z,V,C\}_{16}$. Bits 7–4 of the CSR are the 32-bit operand condition code bits (OCCB) in the order $\{N,Z,V,C\}_{32}$. Bits 13–8 correspond to the source operand context selection feature of the present invention. Bit 8 is an enable source override (ESO) bit which, when set, is used by the processor to select the source operand from the context identified in bits 13–9, i.e., the source thread selection bits (STS).

Bits 19–14 correspond to the destination operand selection feature of the present invention. Bit 14 is an enable destination override (EDO) bit which, when set, is used by the processor to select the context to which the destination operand will write any result from the context identified in bits 19–13, i.e., the destination thread selection bits (DTS).

The present invention permits any thread to modify the context (and therefore the thread) from which the source operand reads and to which the destination operand writes. This feature permits one thread to be a supervisory thread that can control other threads by, for example, initializing threads and starting new tasks. It also permits the supervisory thread to multiplex several tasks onto a single hardware thread, by suspending that thread, reading its state and saving it, writing the state of the new task, and resuming the thread. It also permits a debugger kernel running in one thread to control and monitor another thread. The debug kernel can read and write the state of the thread being debugged and allow the user to control that state.

As described above, in one embodiment of the present invention one thread of the multithreaded system is designated as a supervisory thread, which controls the other threads. When the supervisory thread wants to start another thread, it is able to write to that thread's state in order to initialize it. In some cases, several contexts will be time-multiplexed onto a single hardware thread. In this case, the present invention permits the supervisory thread to read and save the current state of another hardware thread, and write the current state of the next context that needs to be executed. In some applications, these supervisory operations are frequent, so reading or writing another thread's state must be efficient and simple as per the present invention.

Another problem resolved by the present invention is that once the destination context is altered by modifying the destination thread selection bits (DTS) it is not possible for the present thread to switch it back, because the CSR register is part of the thread context.

The present invention solves this problem by creating an instruction for writing a value to the CSR of the currently executing context. In one embodiment of the present invention the instruction is referred to as SETCSR and can be used to overwrite the CSR in the current context which enables it to modify the source (STS) and destination contexts (DTS) as well as the other bits in the CSR.

As described above, the present invention operates in an instruction level multithreading system and method that takes advantage of the zero-time context switch to rapidly (as frequently as every instruction) switch between two or more contexts. Some techniques for how threads are scheduled and how zero-time context switching occurs are described below.

The amount of time that each context executes for is called a quantum. The smallest possible quanta is one clock cycle, which may correspond to one instruction. A quanta may also be less than one instruction for multi-cycle instructions (i.e., the time-slice resolution is determined solely by the quantum and not the instruction that a thread is executing). A detailed description of the allocation and scheduling is described below and is described in U.S. patent application Ser. No. 09/748,098 that is incorporated by reference herein in its entirety.

The allocation of the available processing time among the available contexts is performed by a scheduling algorithm. In one embodiment of the present invention, a benefit occurs when the allocation of quanta is done according to a fixed schedule. This scheduling of the contexts can be broken into three classes strict scheduling, semi-flexible scheduling and loose scheduling.

Figure 7A:
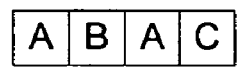
FIG. 7a is an illustration of a strict scheduling example according to one embodiment of the present invention.
Figure 7A:
Figure 7B:
FIG. 7b is an illustration of a semi-flexible scheduling example according to one embodiment of the present invention.
Figure 7B:
Figure 7C:
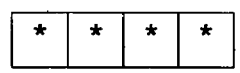
FIG. 7c is an illustration of a loose scheduling example according to one embodiment of the present invention.
Figure 7C:

FIG. 7a is an illustration of a strict scheduling example according to one embodiment of the present invention. FIG. 7b is an illustration of a semi-flexible scheduling example according to one embodiment of the present invention. FIG. 7c is an illustration of a loose scheduling example according to one embodiment of the present invention.

With reference to FIG. 7a, when the scheduler, e.g., the thread controller that is illustrated in FIG. 3, utilizes strict scheduling the schedule is fixed and does not change over short periods of time. For example if the schedule is programmed to be "ABAC" as illustrated in FIG. 7a then the runtime sequence of threads will "ABACABACABAC . . . " as illustrated in FIG. 7a. Threads that are strictly scheduled are called hard-real-time (HRT) threads because the number of instructions executed per second is exact and so an HRT thread is capable of deterministic performance that can satisfy hard timing requirements.

With reference to FIG. 7b, when the scheduler utilizes a semi-flexible scheduling technique some of the schedule is fixed and the rest of the available quanta are filled with non-real time (NRT) threads. For example, if the schedule is programmed to be "A*B*" where "*" is a wildcard and can run any NRT thread, the runtime sequence of threads, with threads D, E and F being NRT threads, could be "ADBEAF-BEAFBE . . . " as illustrated in FIG. 7b.

Some of the benefits of using either strict scheduling or semi-flexible scheduling is that the allocation of execution time for each HRT thread is set and therefore the time required to execute each thread is predictable. Such predictability is important for many threads since the thread may be required to complete execution within a specific time period. In contrast, the interrupt service routine described above with reference to conventional systems does not ensure that the hard real time threads will be completed in a predictable time period.

Figure 7D:
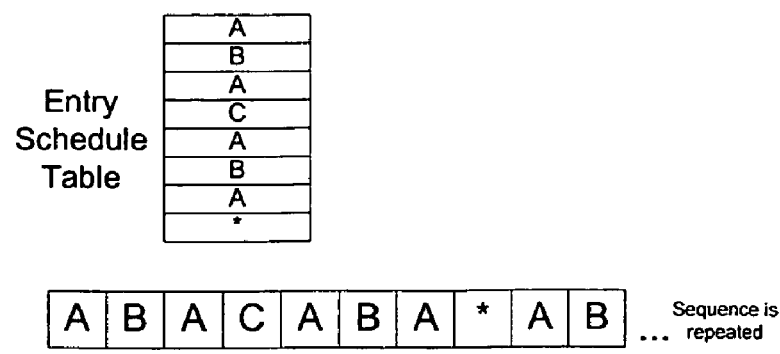
FIG. 7d is an illustration of a semi-flexible thread schedule using three hard-real time threads according to one embodiment of the present invention.

The static and semi-flexible schedule for hard real-time threads is achieved using a programmable quantum cycle table. Each entry in the table represents an available quanta cycle and provides the hard-real-time thread the cycle it is allocated to. The table is of variable length, e.g., up to 64 entries. When the end of the table is reached the scheduler continues from the first element in the table thus providing an infinitely repeating sequence. For example, FIG. 7d is an illustration of a semi-flexible thread schedule using three hard-read time threads according to one embodiment of the present invention. Thread A is scheduled 50% of the time, thread B is scheduled 25% of the time and thread C is scheduled 12.5% of the time. The remaining 12.5% is allocated to processing non-real time threads. If the CPU is clocked at 200 MIPS this would equate to thread A having a dedicated CPU execution rate of 100 MIPS, thread B having a dedicated CPU execution rate of 50 MIPS, thread C having a dedicated CPU execution rate of 25 MIPS and the remaining threads, e.g., non-real time threads, having a minimum CPU execution rate of 25 MIPS.

Accordingly, each hard-real time thread is guaranteed particular execution rate because they are allocated instruction slots as specified in the table, thus they each have guaranteed deterministic performance. The predictability afforded by the present invention significantly increases the efficiency of programs since the time required to execute hard-real time threads is known and the programs do not need to allocate extra time to ensure the completion of the thread. That is, the interrupt latency for each hard-real-time thread is deterministic within the resolution of its static allocation. The latency is determined by the pipeline length and the time until the thread is next scheduled. The added scheduling jitter can be considered to be the same as an asynchronous interrupt synchronizing with a synchronous clock. For example, a thread with 25% allocation will have a deterministic interrupt latency with respect to a clock running at 25% of the system clock.

Although the table reserves the instruction slots for the hard real-time tasks this does not mean that other non-real time tasks cannot also execute in that instruction slot. For example, thread C may be idle most of the time. For example, if thread C represents a 115.2 kbps UART, then it only needs deterministic performance when it is sending or receiving data. There is no need for it to be scheduled when it is not active. All empty instruction slots, and those instruction slots which are allocated to a thread that is not active can be used by the scheduler for non-real time threads.

More than 50 percent of the available MIPS can be allocated to a single thread, although this will result in a non-deterministic inter-instruction delay-the time between successive instructions from the same thread would not be the same. For some applications this varying inter-instruction delay is not a disadvantage. For example a thread could be scheduled in slots 1, 2, 3, 5, 6, 7, 9, . . . to achieve 75 percent of the available MIPS of the CPU. One type of NRT thread scheduling rotates through each thread. That is, the threads are scheduled in order, with one instruction executed from each active thread. This type of semi-flexible scheduling permits non-real-time threads to be scheduled in the empty slots in the schedule, e.g., the quanta labeled "*" in FIG. 7d, and in slots where the scheduled hard real-time thread is not active, e.g., in place of thread B if thread B is not active, as described above. This type of scheduling is sometimes referred to as "round robin" scheduling.

Multiple levels of priority are supported for non-real-time threads. A low priority thread will always give way to higher priority threads. The high level priority allows the implementation of an real time operating system (RTOS) in software by allowing multi-instruction atomic operations on low-priority threads. If the RTOS kernel NRT thread has a higher priority than the other NRT threads under its control then there is a guarantee that no low priority NRT threads will be scheduled while the high priority thread is active. Therefore the RTOS kernel can perform operations without concern that it might be interrupted by another NRT thread.

With reference to FIG. 7c, when the scheduler utilizes a loose scheduling technique none of the quantum are specifically reserved for real time threads and instead any quantum can be used for non-real time (NRT) threads.

A thread can have a static schedule (i.e., it is allocated fixed slots in the HRT table) and also be flagged as an NRT thread. Therefore, the thread will be guaranteed a minimum execution rate as allocated by the HRT table but may execute faster by using other slots as an NRT thread.

The present invention includes hardware support for running multiple software threads and automatically switching between threads and is described below. This multi-threading support includes a variety of features including real time and non-real time task scheduling, inter-task communication with binary and counting semaphores (interrupts), fast interrupt response and context switching, and incremental linking.

By including the multi-threading support in the embedded processor core the overhead for a context switch can be reduced to zero. A zero-time context-switch allows context switching between individual instructions. Zero-time context-switching can be thought of as time-division multiplexing of the core.

Figure 8:
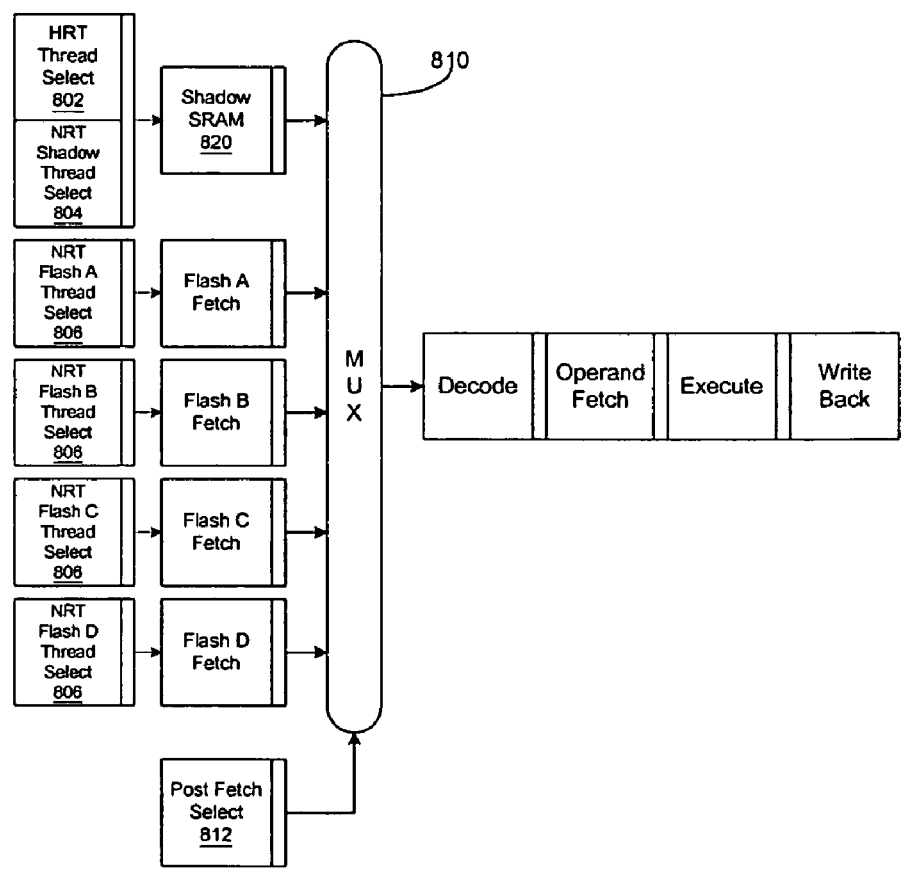
FIG. 8 is an illustration of thread fetching logic with two levels of scheduling according to one embodiment of the present invention.

In one embodiment of the present invention can fetch code from both SRAM and flash memory, even when the flash memory is divided into multiple independent blocks. This complicates the thread scheduling of the present invention. In the present invention, each memory block is scheduled independently of the overall scheduling of threads. FIG. 8 is an illustration of thread fetching logic with two levels of scheduling according to one embodiment of the present invention.

In one embodiment of the present invention the instructions that are fetched can be stored in multiple types of memory. For example, the instructions can be stored in SRAM and flash memory. As described above, accessing data, e.g., instructions, from SRAM is significantly faster than accessing the same data or instructions from flash memory. In this embodiment, it is preferable to have hard real time threads be fetched in a single cycle so all instructions for hard-real-time threads are stored in the SRAM. In contrast, fetching instructions from non-real-time threads can be stored in either SRAM or flash memory.

With reference to FIG. 8, instructions in shadow SRAM are fetched based upon a pointer from either an HRT thread selector 802 or an NRT shadow thread selector 804. Instructions from the flash memory are fetched based upon a pointer from an NRT flash thread selector 806. The thread selectors 802, 804, 806 are described in greater detail below. The output of the SRAM and the flash memory are input into a multiplexor (MUX) 810 that outputs the appropriate instruction based upon an output from a post fetch selector 812, described below. The output of the MUX is then decoded and can continue execution using a traditional pipelined process or by using a modified pipelined process as described below, for example.

Figure 9:
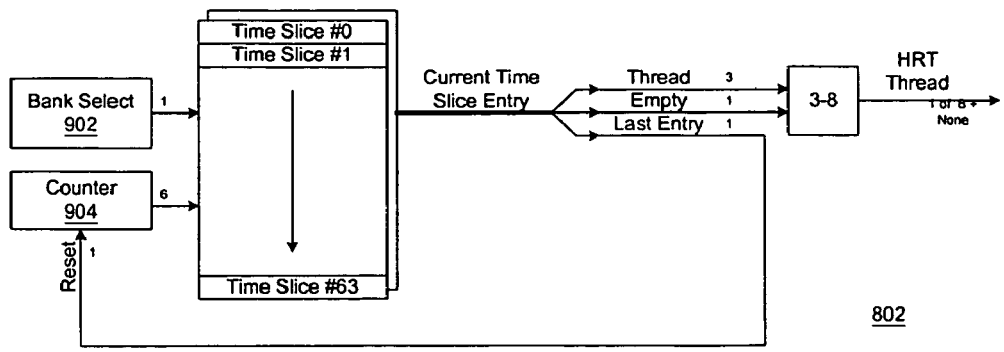
FIG. 9 is an illustration of the HRT thread selector according to one embodiment of the present invention.

FIG. 9 is an illustration of the HRT thread selector 802 according to one embodiment of the present invention. As indicated above, the shadow SRAM 820 provides a single cycle random access instruction fetch. Since hard real time (HRT) threads require single cycle determinism in this embodiment such HRT threads may execute only from SRAM. The HRT thread controller 802 includes a bank selector 902 that allows the choice of multiple HRT schedule tables. The back selector determines which table is in use at any particular time. The use of multiple tables permits the construction of a new schedule without affecting HRT threads that are already executing. A counter 904 is used to point to the time slices in the registers in the HRT selector 802. The counter will be reset to zero when either the last entry is reached or after time slice 63 is read. The counter 904 is used in conjunction with the bank selector 902 to identify the thread that will be fetched by the shadow SRAM in the following cycle. If the identified thread is active, e.g., not suspended then the program counter (PC) of the identified thread is obtained and is used as the address for the shadow SRAM in the following cycle. For example, with respect to FIG. 9, if based upon the bank selector 902 and the counter 904 time slice number 1 is identified, the thread identified by this time slice represents the thread that will be fetched by the SRAM in the following cycle. The output of the block described in FIG. 9 is a set of signals. Eight signals are used to determine which of the eight threads is to be fetched. Of course this invention is not limited to controlling only eight threads. More signals could be used to control more threads. One signal is used to indicate that no HRT thread is to be fetched.

Figure 10:
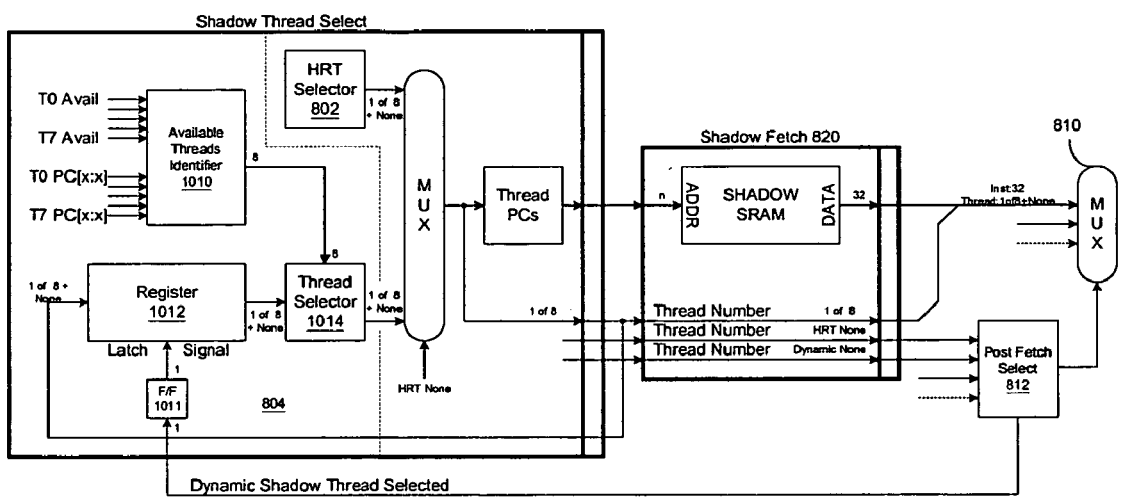
FIG. 10 is an illustration of the NRT shadow SRAM thread selector and SRAM accessing logic according to one embodiment of the present invention.

FIG. 10 is an illustration of the NRT shadow SRAM thread selector 804 and shadow SRAM accessing logic according to one embodiment of the present invention. The NRT shadow thread selector 804 includes an available thread identifier 1010 a register 1012 for identifying the previous dynamic thread that has been fetched from the shadow SRAM and a flip-flop (F/F) 1011. The register and available thread identifier 1010 (described below) are received by a thread selector unit that selects the thread to be accessed by the SRAM in the next cycle, if any. The thread selector 1014 uses the last thread number from 1012 and the available thread identifier from 1010 to determine which thread to fetch next to ensure a fair round-robin selection of the NRT threads.

Figure 11:
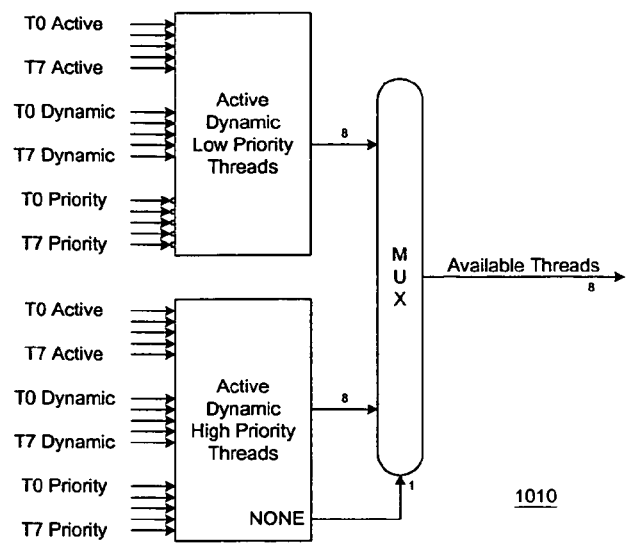
FIG. 11 is an illustration of the NRT thread availability selector according to one embodiment of the present invention.

FIG. 11 is an illustration of the NRT available thread identifier 1010 according to one embodiment of the present invention. The NRT available thread identifier 1010 generates an output for each thread based upon whether the thread is active, whether the thread is identified as being dynamic (NRT), and whether the thread is marked as being of a high priority. If there are no active, dynamic, high priority threads then the NRT available thread identifier 1010 generates an output for each thread based upon whether the thread is active, whether the thread is identified as being dynamic (NRT), and whether the thread is marked as being of a low priority.

The NRT shadow SRAM thread selector 804 generates for each thread a shadow-NRT-schedulable logic output based upon logic that determines whether the NRT schedulable output is true and whether the thread PC points to shadow SRAM. The determination of whether the PC specifies a location in shadow SRAM is done by inspecting the address-the shadow SRAM and flash are mapped into different areas of the address space.

As described above the NRT available thread identifier 1010 identifies the available threads and one of these threads is selected based upon a previous thread that was selected and successfully fetched out of shadow RAM and used by the pipeline that is stored in register 1012.

If the HRT thread selector 802 indicates that the cycle is available for an NRT thread, then the PC of the selected thread is obtained to be used as the address for the shadow SRAM access in the following cycle.

The selected thread number (including if it is 'no-thread') is latched to be the register 1012 unless the current shadow SRAM access is an NRT thread (chosen in the previous cycle) AND the post-fetch selector 812 did not select the shadow SRAM to be the source for the decode stage. That is, the selected thread number is latched to be the "previous thread" register 1012 only if the current shadow SRAM access is a HRT thread OR if the current shadow SRAM access is no-thread OR if the current SRAM access is an NRT thread that has been chosen by the post-fetch selector 812. The post-fetch selector 812 is described in greater detail below.

Figure 12:
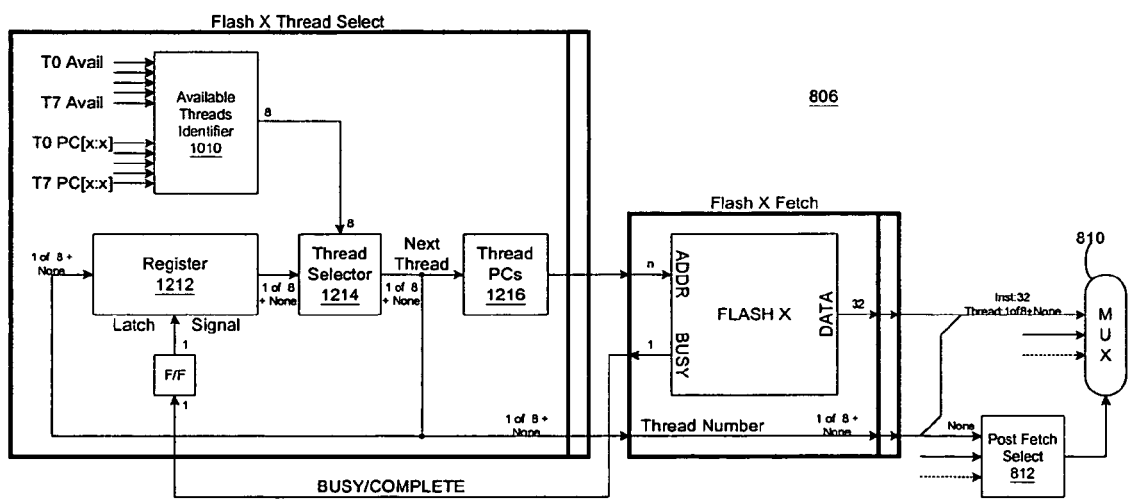
FIG. 12 is an illustration of the NRT flash memory thread selector according to one embodiment of the present invention.

FIG. 12 is an illustration of the NRT flash memory thread selector 806 according to one embodiment of the present invention. The flash read only memory (ROM) requires multiple clock cycles to access its data. In this embodiment of the present invention, in order to increase the instruction rate from the flash ROM the flash is divided into four blocks corresponding to four ranges in the address space. These blocks are identified as flash A, flash B, flash C, and flash D in FIG. 8. Each block can fetch independently and so each requires its own NRT thread selector 806 to determine which threads can be fetched from each particular block. As indicated above, only NRT threads can be executed from the flash ROM.

The intersection of the set of active threads and the set of threads where the PC is in this flash block is generated by the available thread identifier 1010 and is received by a thread selector 1214. The thread selector 1214 uses the previous thread number to select the next thread in a round-robin manner. The thread PCs unit 1214 determines the program counter (PC) for the selected thread and passes this PC to the flash block as the address. The output of the flash is double buffered, meaning that the output will stay valid even after a subsequent fetch operation begins.

Figure 13:
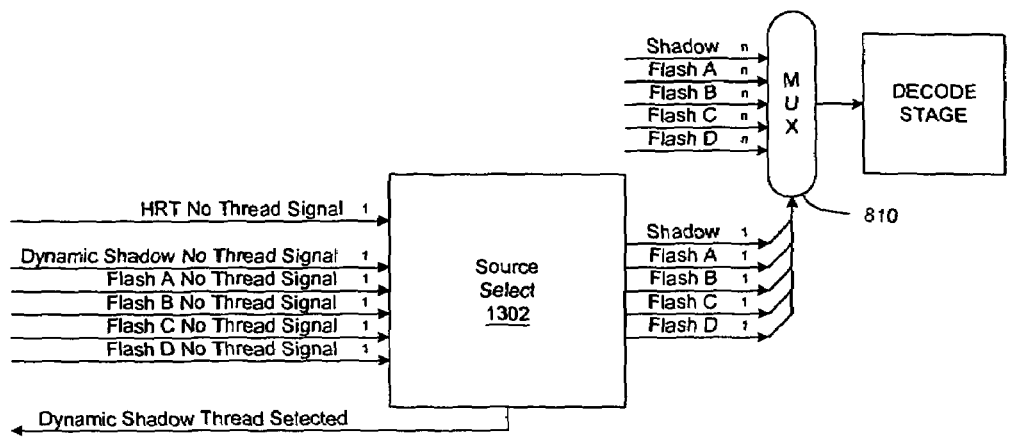
FIG. 13 is an illustration of the post fetch selector according to one embodiment of the present invention.

FIG. 13 is an illustration of the post fetch selector according to one embodiment of the present invention. After each of the flash blocks and SRAM block has selected a thread, the post fetch selector 812 chooses the thread that is passed to the pipeline. If a HRT thread is active this is always chosen. Otherwise an NRT thread will be chosen. In this example the flash/shadow SRAM resource is chosen in a round-robin order, depending on the last flash (or shadow SRAM) block that an NRT thread was selected from by the source selector 1302.

Another aspect of the present invention is the ability to save and restore thread states for either the related thread or another thread. Multithreaded CPUs have several threads of execution interleaved on a set of functional units. The CPU state is replicated for each thread. Often one thread needs to be able to read or write the state of another thread. For example, a real-time operating system (RTOS) running in one thread might want to multiplex several software threads onto a single hardware thread, so it needs to be able to save and restore the states of such software threads.

Other processors have a separate operating system (OS) kernel running on each hardware thread, that is responsible for saving and restoring the state of that thread. This may not be adequate if code from an existing RTOS is to be used to control hardware threads.

One type of instruction set that can be used with the present invention is a memory to memory instruction set, with one general source (memory or register), one register source, and one general destination. The invention allows one thread to set its general source, general destination, or both, to use the thread state of another thread. Two fields in the processor status word, source thread, and destination thread, are used, and override the normal thread ID for the source and/or destination accesses to registers or memory.

This invention allows RTOS code from traditional single-threaded CPUs to be easily ported to the new multithreaded architecture. It gives a simple way state between a worker thread and a supervisory thread.

Figure 14:
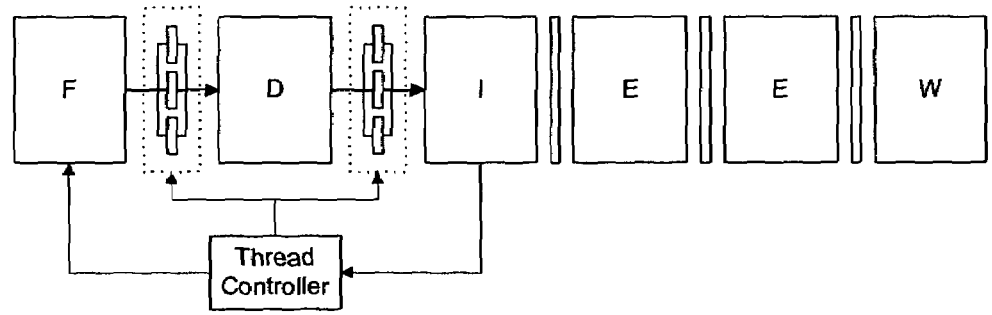
FIG. 14 is an illustration of a multithreaded issue switching pipeline according to one embodiment of the present invention.

In another embodiment of the present invention, the above described multithreading system can be used with more powerful pipeline structures. FIG. 14 is an illustration of a multithreaded issue switching pipeline according to one embodiment of the present invention. In conventional pipeline processing environments the fetch and decode stages result in the same output regardless of when the fetch and decode operations occur. In contrast the issue stage is data dependant, it obtains the data from the source registers, and therefore the result of this operation depends upon the data in the source registers at the time of the issue operation. In this embodiment of the present invention the thread-select decision is delayed to the input of the issue stage.

In one embodiment of the present invention, issue switching is implemented by using thread latches in the fetch and issue stages as shown in FIG. 14. The issue stage decides which thread to execute based not only on priority, and the thread-switching algorithm (as with the pre-fetch selection), but also on data and resource dependencies. Any number of threads could be managed in hardware by increasing the number of latches within the fetch and issue stages.

Figure 15:
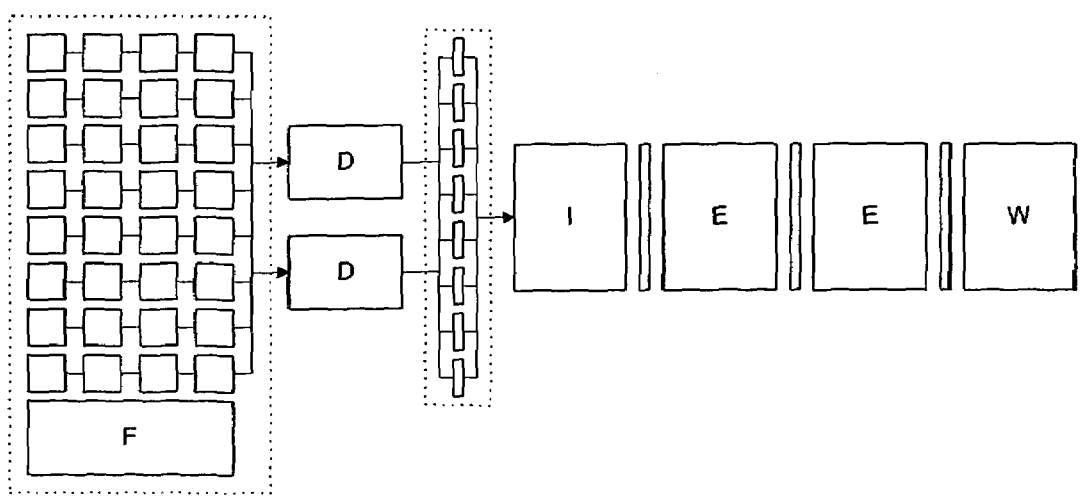
FIG. 15 is an illustration of a multithreaded, pipelined fetch parallel decode pipeline according to one embodiment of the present invention.

FIG. 15 is an illustration of a multithreaded parallel decode pipeline according to one embodiment of the present invention. FIG. 15 shows the parallel fetch and decode enhancement. The parallel fetch stages need memory access during each every cycle and therefore cannot be paralleled without a pre-fetch system or by multi-porting the program memory. Multi-porting of program memory would not be an economical solution as every thread would require its own port with poor utilization. A pre-fetch system could be used to reduce bus contentions by fetching lines of program-memory at a time. If a buffer line was implemented for every thread and these buffer lines were multi-ported between the fetch and decode stages then the fetch unit could supply instructions from any threads in parallel. As a result, the thread-switch can better hide a pipeline flush and decrease the interrupt latency. For example, the jump flush improvement comes in the situation when there are insufficient equal priority threads to launch and a lower priority thread could be launched instead. The interrupt latency improvement would be due to the start of the ISR code being already fetched and decoded ready for issuing on interrupt.

Figure 16:
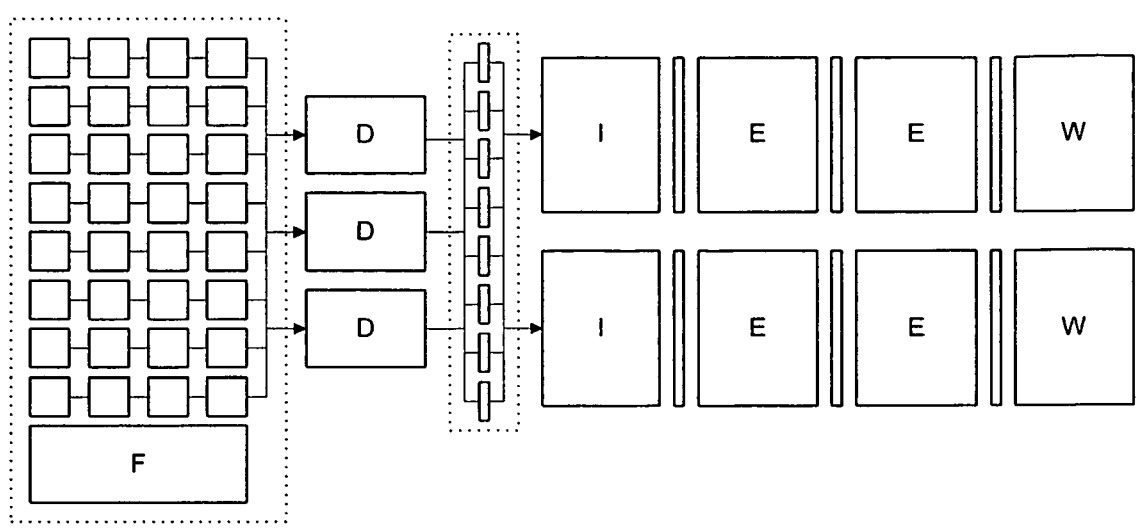
FIG. 16 is an illustration of a multithreaded superscalar pipeline according to one embodiment of the present invention.

FIG. 16 is an illustration of a multithreaded superscalar pipeline according to one embodiment of the present invention. In FIG. 16 multiple instructions are executed in parallel from the same thread or from different thread sin order to maximize the utilization of the execute functional units. The issue stage is responsible for the thread selection, resource allocation, and data dependency protection. Therefore, the issue stage is capable of optimizing the scheduling of threads to ensure maximum resource utilization and thus maximum total throughput. The earlier stages (Fetch and Decode) attempt to maintain the pool of threads available to the issue thread selector.

One feature of the multithreading embedded processor of the present invention is the ability to integrate virtual peripherals (VPs) that have been written independently and are distributed in object form. Even if the VPs have very strict jitter tolerances they can be combined without consideration of the effects on the different VPs on each other.

For example consider the VPs and tolerable jitter below: (1) UART 115.2 kbps, 217 nanoseconds (ns), (2) 10 BaseT Ethernet, 10 ns, (3) TCP/IP stack, 10 milliseconds (ms), and (4) application code, 50 ms. If a designer is integrating these VPs to make a system he or she merely needs to determine the static schedule table.

Since the TCP/IP and application code is timing insensitive both VPs are scheduled as NRT threads. The other two VPs need deterministic response to external events and so must be scheduled as hard real-time threads. If the target CPU speed is 200 MHz then the Ethernet VP requires 50% of the MIPS, i.e., a response of 5 ns, and it cannot have more than one instruction delay between its instructions. The UART VP requires less than 1% of the MIPS but does require to be serviced within its jitter tolerance so is scheduled four times in the table.

The result is that four VPs, possibly each from different vendors, can each be integrated without modifying any code and requiring only some simple mathematics to determine the percentage of total computing power each thread needs. The VPs will work together without any timing problems since each thread that needs it is guaranteed its jitter performance.

Of course the VPs will only work together if they can communicate with each other. This requires the definition of suitable high-level APIs the details of which would be apparent to a person of ordinary skill in the art. Table 1 is an example of a receive UART thread.

TABLE 1

```
UartRxReset
:Start  setb   UartRxPinIntE              ;Enable hardware interrupt
        clrb   UartRxPinIntF              ;Clear hardware interrupt flag
        suspend                           ;Wait for start edge int
        mov    RTCC, #Uart115200 * 1.5    ;Initialise RTCC
        clrb   RTCCIntF                   ;Clear timer interrupt flag
        setb   RTCCIntE                   ;Enable timer interrupt
        mov    UartRxBits, #%0111111111111111   ;Reset data bits
        clrb   UartRxPinIntE              ;Disable hardware interrupt
:Loop   clc                               ;Guess input will be a 0
        suspend                           ;Wait for timer interrupt
        snb    UartRxPin                  ;Is the input 1 ?
        stc                               ;yes => change to a 1
        rr     UartRxBits, 1              ;Add bit to data bits
        snb    UartRxBits.7               ;Complete ?
        jmp    :Loop                      ;No => get next bit
        clc                               ;Will shift in 0
        rr     UartRxBits, 8              ;Shift data bits right 8 times
        mov    UartRxData, UartRxBits     ;Save data
        int    UartRxAvailInt             ;Signal RxAvail interrupt
        clrb   RTCCIntE                   ;Disable timer interrupt
        jmp    :Start                     ;Wait for next byte
```

The thread suspends itself pending the falling edge of the start bit. When this interrupt occurs the thread is resumed and the timing for the incoming data is based on the exact time that the start edge was detected. This technique allows higher accuracy and therefore enables improves the operation of embedded processors.

The thread will suspend itself pending the next timer interrupt for every bit that is received (The RTCC timer is independent for each thread and so will not conflict with other VPs).

On the completion of the byte the code issues a software interrupt to signal to the application layer that a byte is available to be read. The "INT" instruction simply sets the interrupt flag. The application layer will either be polling this interrupt flag or will be suspended and so resumed by this interrupt.

An example of a transmit UART thread is set forth in Table 2.

TABLE 2

```
UartTxReset
        setb    UartTxPin                 ;Idle high
:Start  clrb    RTCCIntE                  ;Disable timer interrupt
        setb    UartTxStartIntE           ;Enable TxStartInt
        suspend                           ;Wait for TxStart int
        clrb    UartTxPin                 ;Output start bit
        mov     RTCC, #Uart115200         ;Initialise RTCC
        clrb    RTCCIntF                  ;Clear timer interrupt flag
        setb    RTCCIntE                  ;Enable timer interrupt
        mov     UartTxBits, UartTxData    ;Save data to transmit
        setb    UartTxBits.8              ;Add stop bit to data
        clrb    UartTxStartIntE           ;Disable TxStart interrupt
        clrb    UartTxStartIntF           ;Clear TxStart interrupt flag
        int     UartTxEmpty               ;Indicate ready for next byte
:Loop   clc                               ;Will shift in 0
        rr      UartTxBits, 1             ;Shift data by 1
        snc                               ;Carry a 0?
        jmp     :1                        ;No => prepare to output 1
:0      suspend                           ;Yes => wait for timer int
        clrb    UartTxPin                 ;Output 0
        mov     RTCC, #Uart115200         ;Initialise RTCC
        test    UartTxBits                ;Check bits
        sz                                ;More bits to send ?
        jmp     :Loop                     ;Yes => prepare next bit
        jmp     :Start                    ;No => wait for next byte
:1      suspend                           ;Wait for timer int
        setb    UartTxPin                 ;Output 1
        mov     RTCC, #Uart115200         ;Initialise RTCC
        test    UartTxBits                ;Check bits
        sz                                ;More bits to send ?
        jmp     :Loop                     ;Yes => prepare next bit
        jmp     :Start                    ;No => wait for next byte
```

The thread suspends itself pending the user-defined TxStart software interrupt. When this interrupt is triggered by the application thread the Tx UART thread is resumed and the byte to be transmitted is transferred into an internal register (UartTxBits). At this point in time the application is free to send a second byte and so the interrupt flag is cleared and the UartTxEmpty interrupt is triggered.

The byte is transmitted by suspending after each bit—pending the next RTCC interrupt (The RTCC timer is independent for each thread and so will not conflict with other VPs).

When the transmission is complete the thread will suspend pending the TxStart interrupt again. It is possible that the TxStart interrupt was triggered during the transmission of the last byte and so the thread may be resumed immediately.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A multithreaded computer based system for enabling a command in a first thread to access data in a second thread comprising:

an embedded pipelined processor capable of having a first program thread and a second program thread in an execution pipeline, said first program thread comprising a first set of instructions, said second program thread comprising a second set of instructions, said embedded processor comprising:

a fetch unit for fetching an instruction from program memory;

a decode unit for decoding said fetched instruction;

an execution unit for executing said decoded instruction; and a write back unit for writing the results of said executed instruction to an identified storage location;

a first set of data storage devices capable of storing a first state of said embedded processor, wherein said first state is the state of the embedded processor during the execution of the first program thread;

a second set of data storage devices capable of storing a second state of said embedded processor, wherein said second state is the state of the embedded processor during the execution of the second program thread;

wherein at least said first set of data storage devices includes a first control status register for identifying a first target set of data storage devices from which a first source operand of a fetched instruction is to be retrieved and for identifying a second target set of data storage devices to which a first result of an executed instruction is to be stored, wherein at least one of said first or said second target set of data storage devices is not included in the first set of data storage devices;

a thread scheduler for identifying which of said program threads said embedded processor executes; and an instruction set including an instruction that overwrites the first control status register when instructions associated with the first set of data storage devices are executed and overwrites a second control status register when instructions associated with the second set of data storage devices are executed;

wherein said processor switches between said first and second state in a time period between the end of the execution of a first program instruction in the first thread and the beginning of the execution of a second program instruction in the second thread;

wherein said processor switches between said first and second states by changing a state selection register.

2. The multithreaded computer based system of claim 1, wherein the embedded pipelined processor further includes a peripheral block.

3. The multithreaded computer based system of claim 2, wherein the peripheral block is one of a phase locked loop and a watchdog timer.

4. The multithreaded computer based system of claim 1, wherein the embedded pipelined processor further includes an internal memory unit comprising a flash memory with a shadow static memory.

* * * * *